(12) United States Patent
Demma (10) Patent No.: US 8,931,428 B2
(45) Date of Patent: Jan. 13, 2015

(54) SCALE ELEMENT FOR A DISPLAY INSTRUMENT, INSTRUMENT CLUSTER AND VEHICLE WITH A SCALE ELEMENT

(75) Inventor: Dino Demma, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 782 days.

(21) Appl. No.: 13/178,929

(22) Filed: Jul. 8, 2011

(65) Prior Publication Data

US 2012/0006253 A1 Jan. 12, 2012

(30) Foreign Application Priority Data

Jul. 10, 2010 (DE) .......................... 10 2010 026 773

(51) Int. Cl.
| | | |
|---|---|---|
| *G01D 13/12* | (2006.01) | |
| *G01D 13/18* | (2006.01) | |
| *B60K 35/00* | (2006.01) | |

(52) U.S. Cl.
CPC ................ *B60K 35/00* (2013.01); *G01D 13/18* (2013.01); *B60K 2350/1064* (2013.01); *B60K 2350/2017* (2013.01); *B60K 2350/2086* (2013.01)
USPC .......................... 116/334; 116/286; 362/23.16

(58) Field of Classification Search
CPC .......... B60K 35/00; B60K 2350/1064; B60K 2350/2017; B60K 2350/2039; B60K 2350/2047; B60K 2350/2086; G01D 11/28; G01D 13/02; G01D 13/04; G01D 13/12; G01D 13/18; G12B 11/02
USPC ............... 116/62.1, 62.4, 286, 287, 288, 334, 116/335, DIG. 5, DIG. 6, DIG. 35, DIG. 36; 362/23.16, 23.17, 489; 40/546; 73/866.3

See application file for complete search history.

(56) References Cited

U.S. PATENT DOCUMENTS

| | | | |
|---|---|---|---|
| 4,761,715 A | 8/1988 | Brooks | |
| 5,258,861 A | 11/1993 | Tsuchiya | |
| 5,272,463 A | 12/1993 | Furuya et al. | |
| 5,284,108 A | 2/1994 | Furuya | |
| 5,414,595 A | 5/1995 | Oike et al. | |
| 5,632,916 A | 5/1997 | Lappalainen et al. | |
| 6,728,464 B1 * | 4/2004 | Waldmann | ..................... 385/147 |
| 7,494,256 B1 * | 2/2009 | Kelman et al. | ................. 362/489 |
| 2002/0001185 A1 * | 1/2002 | Wilhelm et al. | ................ 362/30 |
| 2003/0107550 A1 | 6/2003 | Tuzar | |

(Continued)

FOREIGN PATENT DOCUMENTS

| | | |
|---|---|---|
| DE | 1702941 U | 7/1955 |
| DE | 931196 C | 8/1955 |

(Continued)

OTHER PUBLICATIONS

German Patent Office, German Search Report for Application No. 102010027773.2, dated Nov. 26, 22010.

(Continued)

*Primary Examiner* — Richard A. Smith
(74) *Attorney, Agent, or Firm* — Ingrassia Fisher & Lorenz, P.C.

(57) ABSTRACT

A scale element for a display instrument that includes, but is not limited to a scaling. The scaling is impressed in the volume of the scale element by means of laser shot method. The scale element can furthermore include, but is not limited to a diffusion structure likewise impressed in the volume.

12 Claims, 6 Drawing Sheets

(56) References Cited

U.S. PATENT DOCUMENTS

| | | |
|---|---|---|
| 2003/0116415 A1 | 6/2003 | Ardrey et al. |
| 2003/0121467 A1 | 7/2003 | Furuya |
| 2004/0239750 A1 | 12/2004 | Kneer et al. |
| 2005/0045586 A1 | 3/2005 | Ellin et al. |
| 2005/0146885 A1 | 7/2005 | Sumiyoshi |
| 2005/0211680 A1 | 9/2005 | Li et al. |
| 2009/0026184 A1 | 1/2009 | Ellin et al. |
| 2009/0032506 A1 | 2/2009 | McMurtry et al. |
| 2010/0050927 A1* | 3/2010 | Sultan et al. .......... 116/288 |
| 2012/0255208 A1* | 10/2012 | Demma .................. 40/542 |
| 2013/0314851 A1* | 11/2013 | Zietz ................. 361/679.01 |

FOREIGN PATENT DOCUMENTS

| | | | |
|---|---|---|---|
| DE | 2600230 A1 | 7/1976 | |
| DE | 3042650 A1 | 5/1981 | |
| DE | 4204878 A1 | 8/1992 | |
| DE | 4339192 A1 | 6/1994 | |
| DE | 4313530 A1 | 10/1994 | |
| DE | 19608937 A1 | 9/1996 | |
| DE | 19529390 A1 | 2/1997 | |
| DE | 10141751 A1 | 3/2003 | |
| DE | 10160749 A1 | 6/2003 | |
| DE | 10225946 A1 | 12/2003 | |
| DE | 10343484 A1 | 4/2005 | |
| DE | 112006002720 T5 | 11/2008 | |
| EP | 0521339 A1 | 1/1993 | |
| EP | 1079209 A1 | 2/2001 | |
| EP | 1610099 A2 | 12/2005 | |
| GB | 2444018 B | 3/2011 | |
| JP | 63193012 A | 8/1988 | |
| JP | 02266227 A * | 10/1990 | ............ G01D 13/28 |
| JP | 02310471 A * | 12/1990 | ............... G01P 1/07 |
| JP | 03025318 A * | 2/1991 | ............... G01D 7/00 |
| JP | 4033784 A | 2/1992 | |
| JP | 5169286 A | 7/1993 | |
| JP | 07280600 A * | 10/1995 | ............ G01D 13/28 |
| JP | 08193853 A * | 7/1996 | ............ G01D 13/28 |
| JP | 2005061924 A * | 3/2005 | ............ G01D 13/20 |
| JP | 2007132760 A | 5/2007 | |
| JP | 2012188045 A * | 10/2012 | ............ B60K 35/00 |
| WO | 9411146 A1 | 5/1994 | |
| WO | 2006109020 A1 | 10/2006 | |
| WO | 2006120440 A1 | 11/2006 | |

OTHER PUBLICATIONS

British Patent Office, British Search Report for Application No. 1111171.3, dated Oct. 20, 2011.

Baum, A., et al. "NUV and NIR Fetosecond Laser Modification of PMMA," Proceedings of LPM 2007—the 8th International Symposium on Laser Precision Microfabrication, 2007, pp. 1-5.

Cheng, Y., et al. "Optical gratings embedded in photosensitive glass by photochemical reaction using a femtosecond laser," Optics Express, Jul. 28, 2003, pp. 1809-1816, vol. 11, No. 15.

Mochizuki, H., et al. "Density characterization of femtosecond laser modification in polymers," Applied Physics Letters, Mar. 2008, pp. 091120-091120-3, vol. 92, No. 9.

Mochizuki, H., et al. "Fabrication of diffractive optical elements inside polymers by femtosecond laser irradiation," Thin Solid Films, 2009, pp. 714-718, vol. 518, No. 2.

Scully, P.J., et al. "Femtosecond laser irradiation of polymethylmethacrylate for refractive index gratings," Journal of Optics A: Pure and Applied Optics, 2003, pp. S92-S96, vol. 5, No. 4.

Wochnowski, C., et al. "Femtosecond-laser induced formation of grating structures in planar polymer substrates," Journal of Optics A: Pure and Applied Optics, 2005, pp. 493-501, vol. 7, No. 9.

Wochnowski, C., et al. "Fs-laser-induced Fabrication of Polymeric Optical and Fluidic Microstructures," JLMN-Journal of Laser Micro/Nanoengineering, 2006, pp. 195-200, vol. 1, No. 3.

Zhai, J., et al. "The fabrication of permanent holographic gratings in bulk polymer medium by a femtosecond laser," Journal of Physics D: Applied Physics, 2001, pp. 3466-3469, vol. 34, No. 24.

* cited by examiner

SCALE ELEMENT FOR A DISPLAY INSTRUMENT, INSTRUMENT CLUSTER AND VEHICLE WITH A SCALE ELEMENT

CROSS-REFERENCE TO RELATED APPLICATION

This application claims priority to German Patent Application No. 102010026773.2, filed Jul. 10, 2010, which is incorporated herein by reference in its entirety.

TECHNICAL FIELD

The technical field relates to a scale element for a display instrument for example the speedometer of a vehicle. Furthermore, it relates to an instrument cluster as well as a vehicle with such a scale element.

BACKGROUND

From DE 199 04 597 A1 a display instrument with a translucent scale element is known, wherein a pointer is arranged behind the scale element and illuminated. There, the scaling can be engraved in the surface of the scale element in order to ensure as well as possible a protection against damages.

Display instruments, particularly for instrument clusters of vehicles, on the one hand have to be functional but on the other hand also favorably integrateable visually in an overall concept. Desirable would be a preferably uncompromising combinability of functionality, integrateability in a vehicle cockpit and visual impression. In addition, display instruments should be individually adaptable to the needs of the driver in various driving situations.

At least one object therefore is to state a scale element which makes possible a particularly flexible embodiment and integration in its surroundings. In addition, at least a further object is to state an instrument cluster and a vehicle with a scale element. Furthermore, other objects, desirable features and characteristics will become apparent from the summary and subsequent detailed description, and the appended claims, taken in conjunction with the accompanying drawings and this background.

SUMMARY

According to an embodiment a scale element for a display instrument with a scaling is provided. The scaling is impressed in the volume of the scale element by means of laser shot method. Scaling, here, and in the following, is to more preferably mean a scale, that is a sequence, in the wider sense also a number of read-off marks arranged less stringently, which in interaction with a pointer or a similar device make possible the display of a value. The term scaling furthermore is to include the inscription of a scale for example with numbers, words or symbols. In particular, the scale element is to be embodied transparently or partially transparently, and certain regions can also be embodied transparently and others not transparently.

According to a further embodiment a scale element for a display instrument with a scaling is provided. The scaling is impressed in the volume of the scale element and the scale element furthermore comprises a diffusion structure likewise impressed in the volume. The diffusion structure in an embodiment is designed as a flat disk substantially aligned parallel to two parallel main surfaces of the scale element. The diffusion structure in this case can be integrated both in the volume of a scale disk of the scale element as well as in a separate diffusion disk likewise preferentially embodied of glass, which together with the scale disk forms the scale element. The diffusion structure has more preferably the objective of diffusing suitably irradiated light in such a manner that to a beholder it becomes visible within the diffusion structure. By means of such a diffusion structure a display needle formed of scattered light can for example be formed in the scale disk. Both the scaling as well as the diffusion structure can also be impressed with this embodiment by means of laser shot methods.

The laser shot method is suitable for introducing voids or hollow structures in glass bodies. For the scale element, glass is more preferably employed. The laser shot method has the advantage that it makes possible the introduction of scalings not only in the surface but also into the volume of the glass. This allows the introduction of structures in a plurality of planes, so that on the one hand the space available in the scale element can be utilized as best as possible while on the other hand an attractive 3D-effect can also be created, particularly if the scale element is additionally illuminated in a suitable manner.

In an embodiment, the scaling is therefore formed through hollow bodies, areas and/or tightly packed shot layers arranged in the volume of the scale element, wherein the hollow bodies, areas and/or tightly packed shot layers forming the scaling can be arranged by groups in a plurality of planes. In this manner, for example a scale can be arranged on a plane and an inscription of the scale with numbers on another plane. This arrangement allows a different illumination of the scale and of the numbers with laterally entering light, which can be varied in color or intensity. This has the advantage that the display instrument can not only be designed in a visually attractive manner in a technically simple fashion but also be embodied highly user-friendly and clearly arranged.

According to an embodiment the scale element is inserted in a display instrument of an instrument cluster. There, either all or only some of the display instruments of the instrument cluster can comprise such a scale element. In an embodiment, the display instrument comprises a pointer connected to a pointer shaft in a rotationally fixed manner with a pointer flag that can be driven by the pointer shaft for displaying a value on the scale element. This embodiment thus combines the scale element with scalings produced by laser shot method with a conventional "mechanical" pointer flag.

In another embodiment the display instrument comprises a pointer with a pointer flag that is formed through light scattered on the diffusion structure. In this embodiment, instead of the conventional "mechanical" pointer flag a "visual" one is realized. This embodiment has the advantage that it allows greater flexibility in the arrangement of the pointer flag and additionally saves space since the pointer flag is transferred into the diffusion structure and thus into the scale element proper.

Through a suitable selection of the light for generating the pointer flag influence can likewise be exerted on its visibility and the visual overall impression. In particular, the illumination of the scale element and particularly the pointer flag can be adapted in color and intensity to the driving situation, particularly to the surrounding brightness as well as the wishes of the driver.

To create the visual pointer flag the following is advantageously provided: a diffusion structure which extends into the volume in which the pointer flag is to be created, and which scatters light shining on the volume to a beholder, thus making it visible in the volume; in particular, the diffusion structure extends parallel to a main surface of the scale element. A device for introducing light into the diffusion structure. This device is either designed for the introduction of a light bundle delimited for example through one or a plurality of optical fibers or for the generation of plane light and its delimitation through a screen.

In this case, the screen can be designed more preferably in such a manner that it covers the entire or large regions of a delimitation area of the scale element—for example main surfaces and surface areas in the case of a flat disk—and merely comprises a gap for the targeted passage of light. In this case, the screen is displaceable, for example rotatable, at least the position of the gap can be varied in order to be able to vary the position of the pointer flag created. If a "visual" pointer flag is employed there are various possibilities of introducing the light necessary for this purpose into the scale element. In an embodiment, the scale element is designed as round disk. The light forming the pointer flag can be introduced into the diffusion structure from the center, from the side or through a bottom surface of the disk. Advantageously, a device for introducing light for a basic illumination in the scale element is provided. Such a basic illumination does not serve for the creation of the "visual" pointer flag but the light for this is exclusively or additionally introduced into the scale element outside the diffusion structure in order to illuminate the scalings and numbers or inscriptions in a three-dimensional manner.

According to an embodiment, a display instrument comprises at least one scale element according to the invention, wherein the display instrument comprises a display monitor and the scale element is arranged in front of or behind the display monitor or is designed as part of the display monitor. The display instrument can be integrated in an instrument cluster. Because of the transparency of the scale element this can be arranged in front of or behind a display monitor or be designed as part of a display monitor. The display monitor can for example be a liquid crystal monitor, e.g., a TFT monitor, a plasma monitor or another monitor.

The visibility of items arranged behind the scale element also depends on the current illumination of the scale element. It is therefore possible to realize a display instrument with a plurality of functionalities, in that the scale element is arranged in front of a further scale element, another monitor or another display and in that changes are made between the various display functions as required. The various display functions in each case can either only utilize one of the different scale elements, monitors or displays or a combination of a plurality of these.

There, the scale element can practically supplement the display on a monitor. For example, the problem that the display on display monitors can only be seen with difficulty when exposed to direct sunlight frequently occurs with display monitors. To solve this problem, such a monitor can be combined with the scale element according to the invention, wherein the scale element comprises the engraved scale with an inscription or numbers and thus the static information. The monitor combined with the scale element can likewise comprise a scale with inscription or numbers, but it additionally comprises the pointer and thus the corresponding dynamic information. When upon intense light exposure the display of the static information on the monitor can only be seen with difficulty, the scale element replaces this. In such a case, the pointer can be perceived even more easily because of its movement.

According to an embodiment the scale element is employed in a vehicle. It can be used both in an instrument cluster as well as in another position in the vehicle. Because of its transparency it can be arranged for example in the region of a windscreen of the vehicle. The scale element has the advantage that because of its transparency and the convertibility of its appearance through a suitable illumination it can be employed particularly flexibly. In addition, it saves installation space since the pointer flag can be moved into the volume of the scale element.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
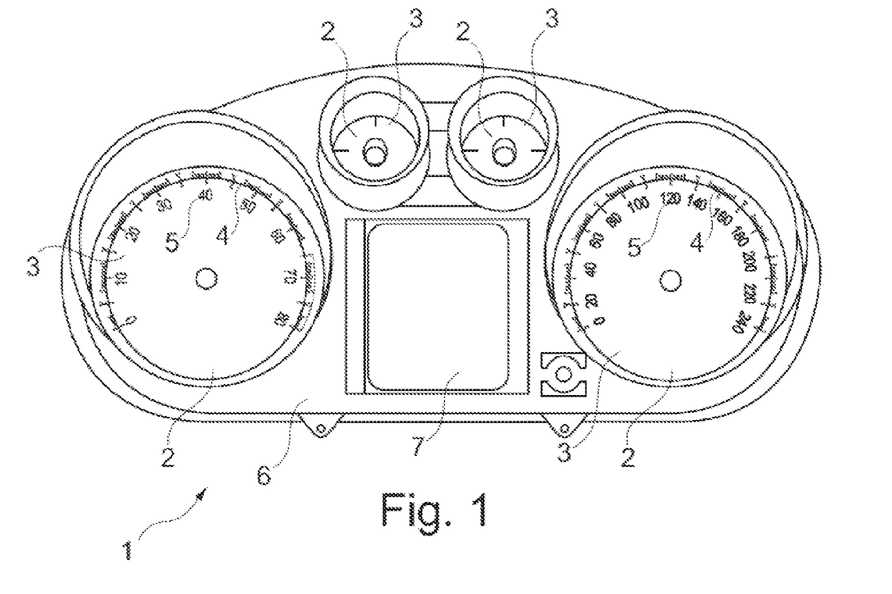
FIG. 1 shows schematically an instrument cluster with scale element according to an embodiment.

FIG. 1 shows schematically an instrument cluster 1 for a vehicle with a plurality of display instruments 2 accommodated in a common housing 6 with scale elements 3, for example speedometer, tachometer, filling level display, display of the cooling water temperature. The display instruments 2 comprise the scale elements 3 with scales 4 and inscriptions 5 as well as pointers which are not shown in FIG. 1 with the help of which values on the scale elements 3 can be displayed. In the housing 6, a further display instrument with a liquid crystal monitor 7 is additionally arranged.

Figure 2:
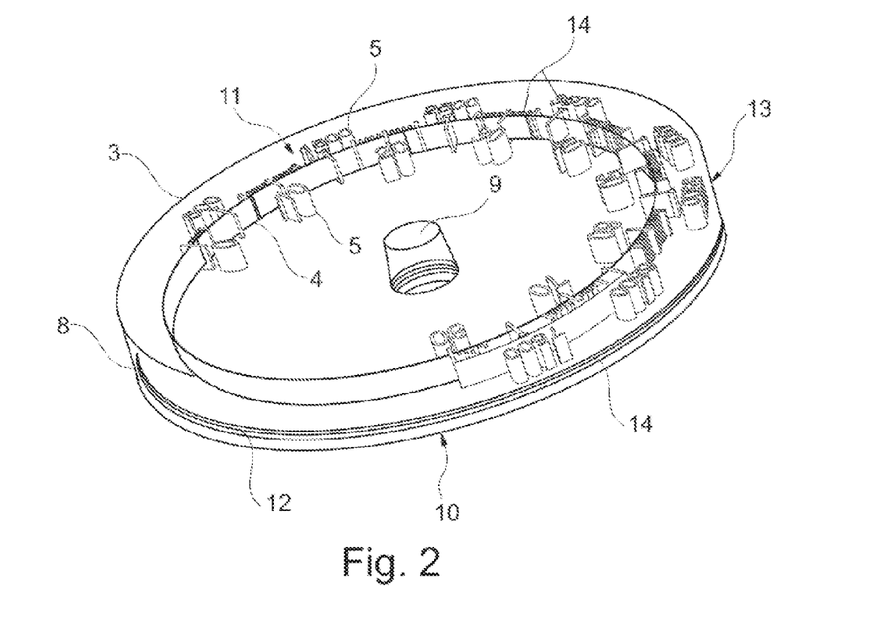
FIG. 2 shows schematically a perspective view of a scale element according to FIG. 1.

FIG. 2 shows details of a scale element 3 according to FIG. 1. The scale element 3 comprises a transparent, round scale disk 8 formed of glass with a first main surface 10 and a second main surface 11 parallel thereto as well as a surface area 13. In the installed state of the scale element 3 the second main surface 11 faces the beholder, wherein the first main surface 10 forms the bottom side of the scale element 3. The scale disk 8 additionally comprises a central hole 9 for the arrangement of a pointer which is not shown in FIG. 2.

Into the volume of the scale disk 8 the scales 4 and inscriptions 5 are introduced by means of laser shot method or laser engraving. These form a plurality of groups of voids or hollow bodies 14 in the glass of the scale disk 8 arranged in different planes and constitute diffusion centers for the entering light which lets them stand out visibly. In the volume of the scale disk 8 a diffusion structure 12 is additionally arranged, which consists of a number of shot surfaces substantially arranged parallel to each other and to the main surfaces 10, 11 of the scale disk 8. In the shown embodiment, the diffusion structure in the scale disk 8 itself is arranged below the scale 4, i.e., between the first main surface 10 and the scale 4. Starting out from the central hole 9 it extends over the entire circumference of the scale disk 8 as far as to its outer region. The diffusion structure 12 scatters entering light thus making it visible within the scale disk 8.

Figure 3:
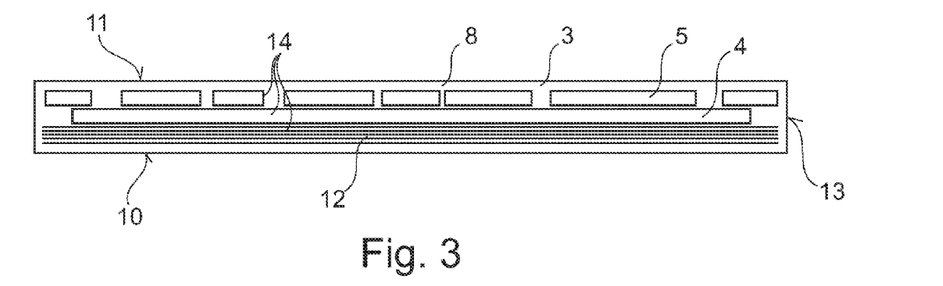
FIG. 3 shows schematically a lateral view of a scale element according to FIG. 1.

FIG. 3 shows schematically the scale disk 8 from the side. From this representation, the arrangement of the different groups of hollow bodies 14 in different planes of the scale disk 8 as well as the expansion of the diffusion structure 12 consisting of a number of shot layers is clearly visible.

Figure 4:
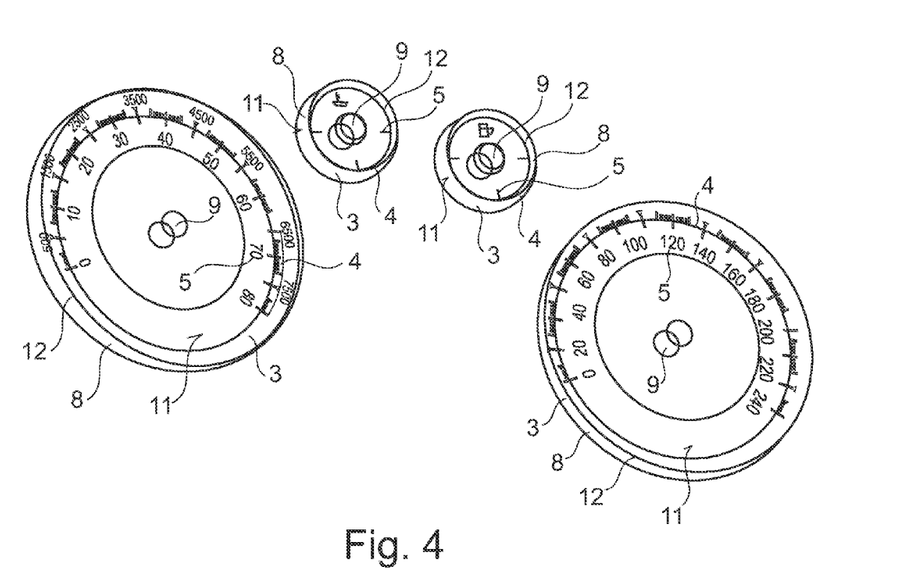
FIG. 4 shows schematically a perspective view of the scale element of the instrument cluster according to FIG. 1.

FIG. 4 shows schematically a perspective view of four scale elements 3 which in the shown embodiment are scale elements of a speedometer, of a tachometer, of a display of the cooling water temperature as well as of a filling level display of the tank.

Figure 5:
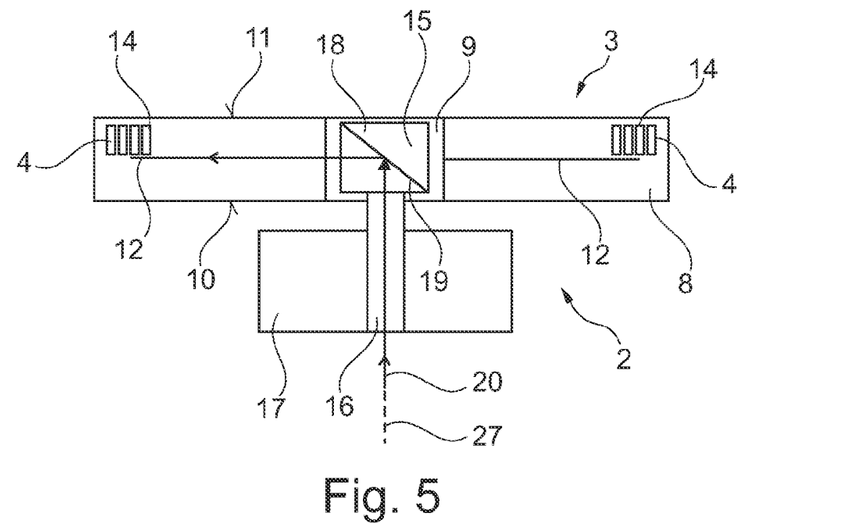
FIG. 5 shows schematically a cross section through a display instrument with a scale element according to a first embodiment.

FIG. 5 shows schematically a cross section through a display instrument 2 with a scale element 3 according to a first embodiment of the invention. The display instrument 2 in addition to the scale element 3 comprises a pointer 15, by means of which values are displayed on the scale 4.

The pointer 15 is arranged on a shaft 16 and rotatable through a drive 17, typically a stepping motor. It comprises a pointer head 18 with a mirror 19 arranged on the shaft 16 in a rotationally fixed manner, which can be accommodated on a beveled end face of the pointer head 18. The pointer 15 does not comprise a conventional pointer flag, but this is formed through a light beam as follows.

Through a light source which is not shown, for example a laser, a light beam 20 is provided, which is coupled into the pointer 15 along an axis 27 of the shaft 16, for the purpose of which the shaft and the pointer 8 are formed of a suitable transparent material. The mirror 19 deflects the light beam 20 parallel to the main surfaces 10, 11 of the scale disk 8 into the diffusion structure 12.

In the diffusion structure the light beam 20 is scattered, as a result of which it becomes visible as luminous strip in the scale disk 8. The drive 17 is activated in such a manner that it rotates the pointer head 18 by the angle corresponding to the value to be displayed on the scale element 3. In this manner, a rotation of the pointer head 18 with the mirror 19 causes a rotation of the deflected light beam 20, which thus forms a visual pointer flag.

Figure 6:
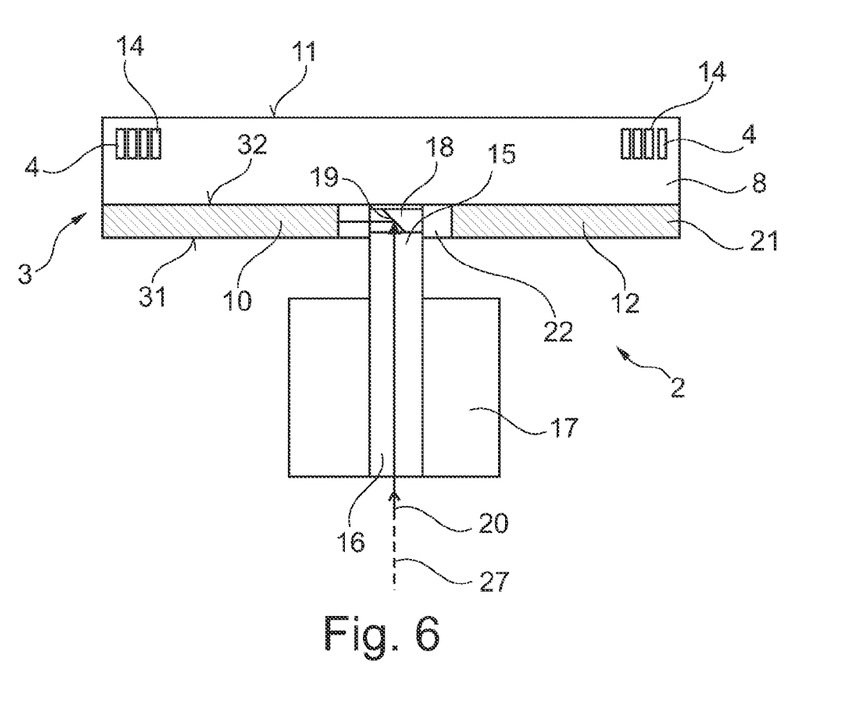
FIG. 6 shows schematically a cross section through a display instrument with a scale element according to a second embodiment.

FIG. 6 shows schematically a cross section through a display instrument 2 with a scale element 3 according to a second embodiment, wherein the diffusion structure 12 is accommodated in a separate diffusion disk 21, which together with the scale disk 8 forms the scale element 3. The diffusion disk 21 has the same diameter as the scale disk 8 and with its second main surface 32 abuts the first main surface 10 of the scale disk 8. Its first main surface 31 forms the bottom side of the scale element 3 in the installed state. With the scale element 3 according to the second embodiment, only the diffusion disk 21 has a central hole 22, through which as described a light beam 20 can be directed into the diffusion structure 12. In a version of the second embodiment which is not show, the scale disk 8 also has a central hole, via which light for example can be coupled in for an illumination of the scale 4.

In the embodiments shown in the FIG. 5 and FIG. 6 the light forming the visual pointer flag is coupled into the diffusion structure 12 via the central hole 9 in the scale disk 8 or the central hole 22 in the diffusion disk 21. However, further additional possibilities can be considered.

Figure 7:
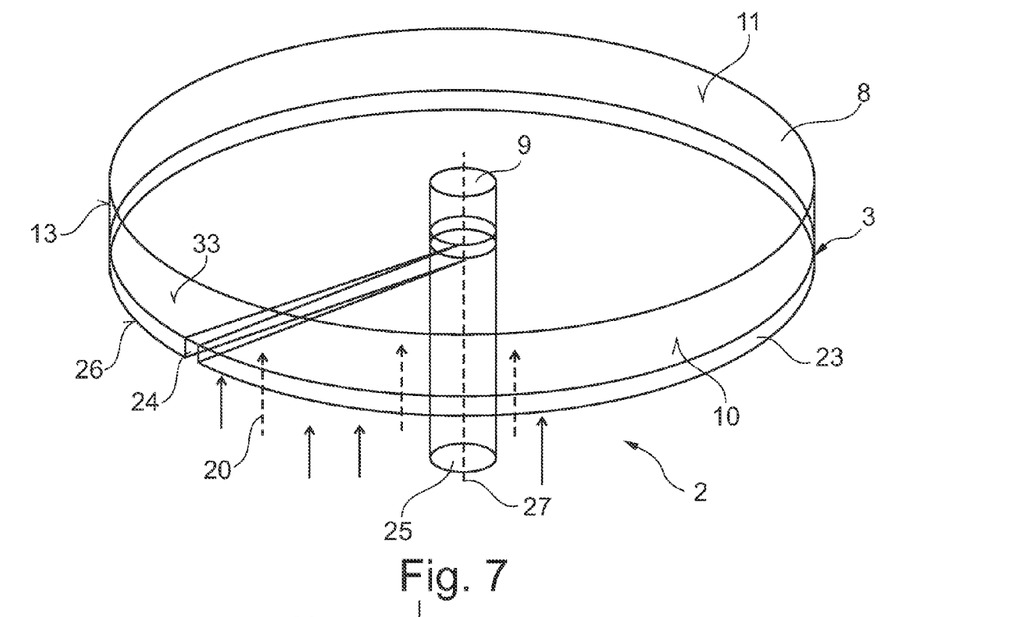
FIG. 7 shows a scale element with a scale element according to a third embodiment.

FIG. 7 shows schematically a perspective view of a display instrument 2 with a scale element 3 according to a third embodiment of the invention. This embodiment differs from the first and the second in that the light forming the visual pointer flag is coupled into the diffusion structure 12 arranged in the scale disk 8 which in FIG. 7 is not shown for the sake of clarity through the first main surface 10.

To this end, a non-transparent rotatable disk 23 is provided in the third embodiment, which with its second main surface 33 abuts the first main surface 10 of the scale disk 8 and forms a screen. The first main surface 26 of the rotatable disk 23 in the installed state forms the bottom side of the scale element 3.

The rotatable disk 23 is mounted on a shaft 25 in a rotationally fixed manner, which shaft is rotatable via a drive which is not shown, for example a stepping motor. The rotatable disk 23 comprises a gap 24 through which the light beams 20 entering perpendicularly to the main surfaces 10, 11, 26, 33 are coupled into the scale disk 8 and the diffusion structure 12 arranged therein. The light entering through the gap 24 and scattered in the diffusion structure 12 thus forms a visual pointer flag. The drive is activated in such a manner that it rotates the rotatable disk 23 by the angle corresponding to the value to be displayed on the scale element 3 and thus against the fixed scale disk 8. In this manner, a rotation of the rotatable disk 23 with the gap 24 causes a rotation of the visual pointer flag formed by the transmitted light beams 20.

In an embodiment which is not shown, at least two substantially not transparent disks are provided instead of the rotatable disk 23 with the gap 24, of which at least one is rotatable. With this embodiment, a gap growing in width is exposed upon rotation of the disks through which the light can pass. Accordingly, in this embodiment, the pointer flag is not realized through a narrow luminous region but through the one edge of an illuminated surface.

Figure 8:
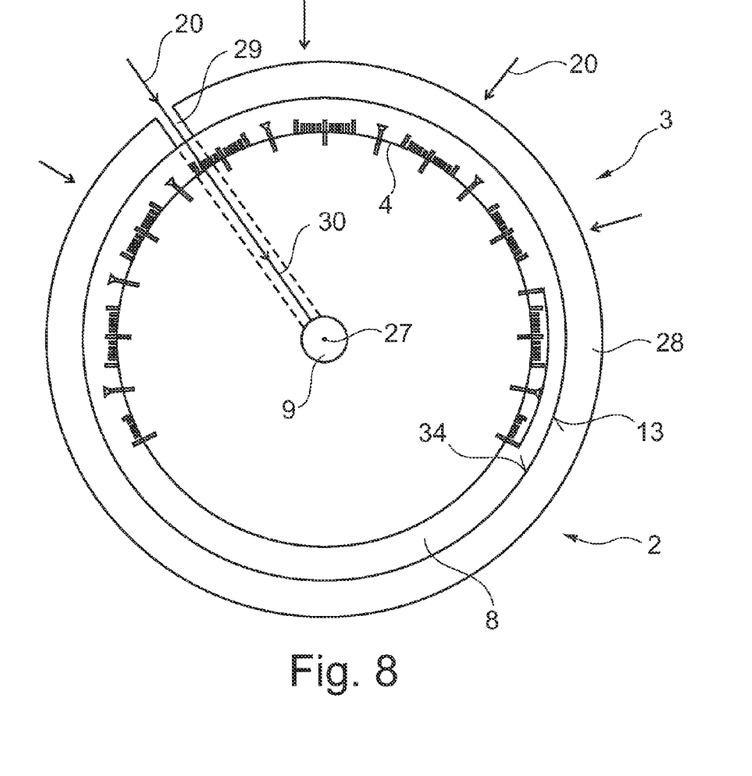
FIG. 8 shows schematically a top view of a display instrument with a scale element according to a fourth embodiment.

FIG. 8 shows schematically a top view of a display instrument 2 with a scale element 3 according to a fourth embodiment. This embodiment differs from the ones already described in that the light forming the visual pointer flag is coupled into the diffusion structure 12 arranged in the scale disk 8 which is not shown in FIG. 8 for the sake of clarity through the surface area 13.

To this end, a not transparent rotatable hollow cylinder 28 is provided in the fourth embodiment, which with its inner surface 34 abuts the surface area 13 of the scale disk 8 and forms a screen. The rotatable hollow cylinder 28 is mounted on a shaft which is not shown in a rotationally fixed manner, which shaft is rotatable via a drive which is not shown, for example a stepping motor. The rotatable hollow cylinder 28 comprises a gap 29 through which light beams 20 entering perpendicularly to the surface area 18 are coupled into the diffusion structure 12 arranged in the scale disk 8. The light which passes through the gap 29 and is scattered in the diffusion structure 12 thus forms a visual pointer flag.

The drive is activated in such a manner that it rotates the rotatable hollow cylinder 28 by the angle corresponding to the value to be displayed on the scale element 3 and thus against the fixed scale disk 8. In this manner, a rotation of the rotatable hollow cylinder 28 with the gap 29 causes a rotation of the visual pointer flag formed through the admitted light beams 20.

In the embodiment shown in FIG. 8 the scale disk 8 has a central hole 9 which can be filled or mirrored with a light-impermeable material and has the objective of absorbing or reflecting light entering the gap 29 so that the visual pointer flag remains limited to the region 30 between the surface area 13 and the central hole 9.

Combinations of the described embodiments, for example combinations of the different possibilities of the light introductions described in FIG. 5, FIG. 7 and FIG. 8 with the two different arrangements of the diffusion structure described in FIGS. 5 and 6 are likewise conceivable. Accordingly, separate diffusion disks 21 cannot only be provided with a light introduction through the central hole 9 or 22, but also with a light introduction through the first main surface 10 or 31 or through the surface area 13.

Furthermore, a plurality of possibilities of the light introduction can be combined in order to illuminate different elements of the scale element 3 in a different manner, i.e., for example with different intensity and in different colors, independent of one another. For example, light for the visual pointer flag can be introduced through the central hole 9, such for an illumination of the scale 4 through the surface area 13 and such for a background lighting through the first main surface 10, wherein a screen can also be omitted if the illumination of the entire scale element 3 or further regions thereof is to be achieved.

Figure 9:
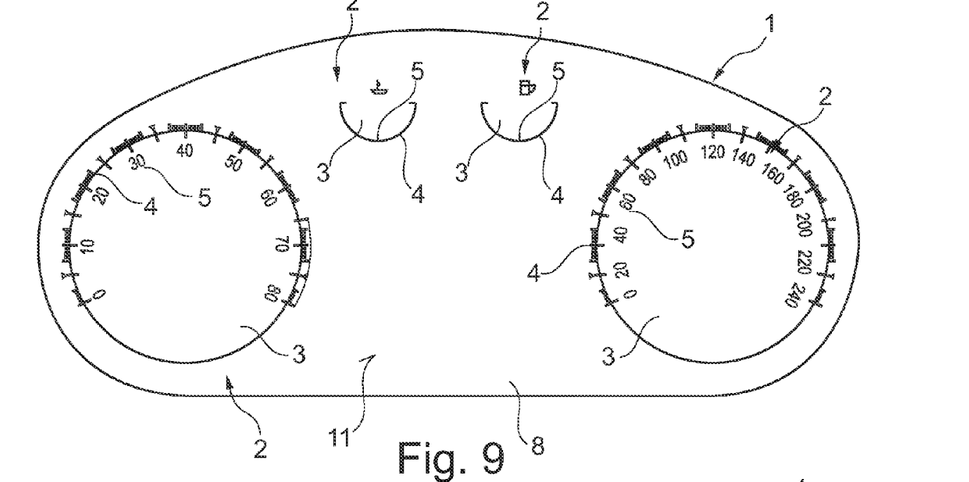
FIG. 9 shows schematically a front view of an instrument cluster according to a fifth embodiment.

FIG. 9 shows schematically a front view of an instrument cluster 1 according to a fifth embodiment. The instrument cluster 1 according to this embodiment comprises a central scale disk 8 of glass, in the volume of which four scale elements 3 are engraved. The scale disk 8 according to this embodiment is thus not designed round but crescent-shaped as the entire instrument cluster 1.

Figure 10:
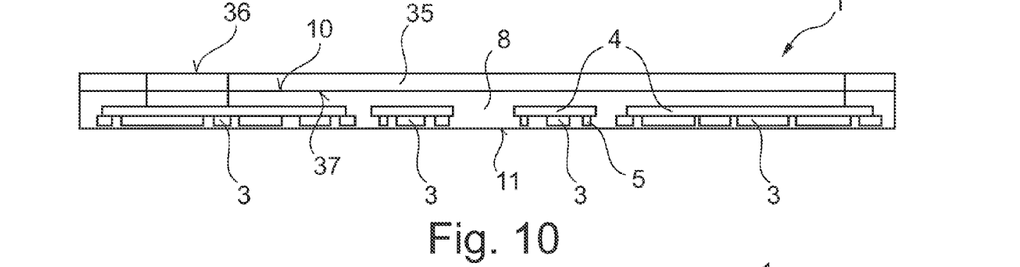
FIG. 10 shows schematically a lateral view of the instrument cluster according to FIG. 9.

FIG. 10 shows schematically a lateral view of the instrument cluster 1 according to FIG. 9. In the lateral view it is visible that a monitor 35 is set against the first main surface 10 of the scale disk 8, whose second main surface 37 abuts the first main surface 10 of the scale disk 8 and which with its first main surface 36 forms the back side of the instrument cluster 1.

According to the fifth embodiment, a monitor 35, for example a plasma monitor, is arranged behind the scale disk 8. The pointers with the shown embodiment are displayed on the monitor 35. However, providing a hole penetrating the scale disk 8 and/or the monitor 35 and realizing a "visual" pointer flag as was described by means of the FIGS. 1 to 8, is also conceivable.

Figure 11:
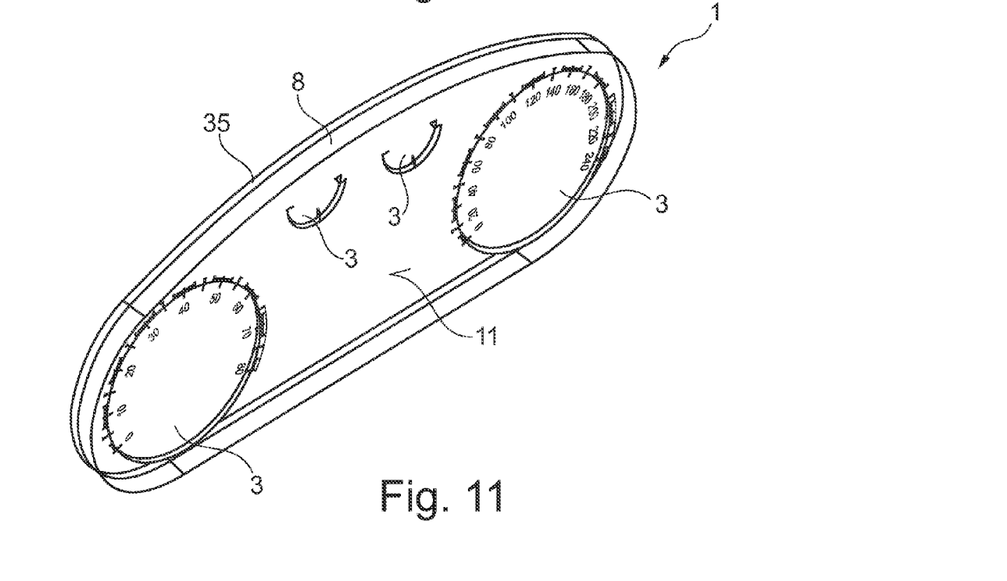
FIG. 11 shows schematically a perspective view of the instrument cluster according FIG. 9.

FIG. 11 shows schematically a perspective view of the instrument cluster 1 according to FIG. 9. In this view, the arrangement of the monitor 35 behind the scale disk 8 is clearly visible.

Figure 12:
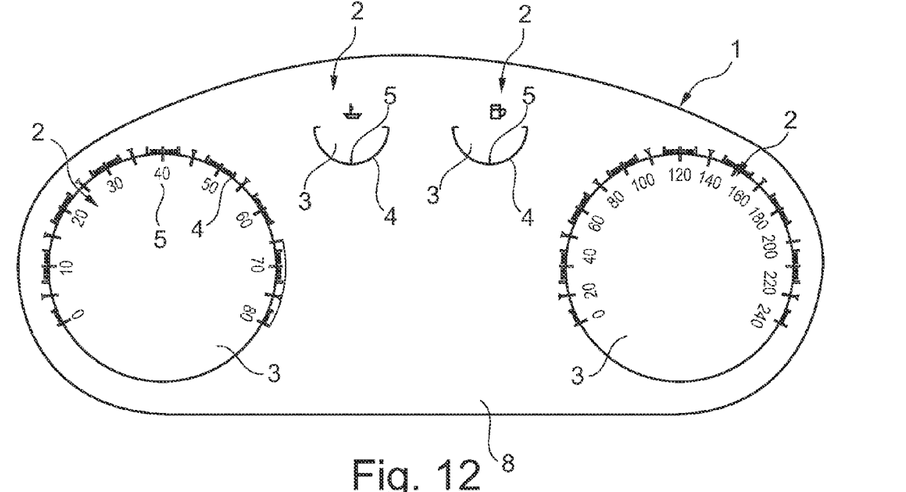
FIG. 12 shows schematically a front view of an instrument cluster according to a sixth embodiment.

FIG. 12 shows schematically a front view of an instrument cluster 1 according to a sixth embodiment of the invention. This embodiment differs from the fifth one in that it comprises a liquid crystal monitor, of which the scale disk 8 is a part.

Figure 13:
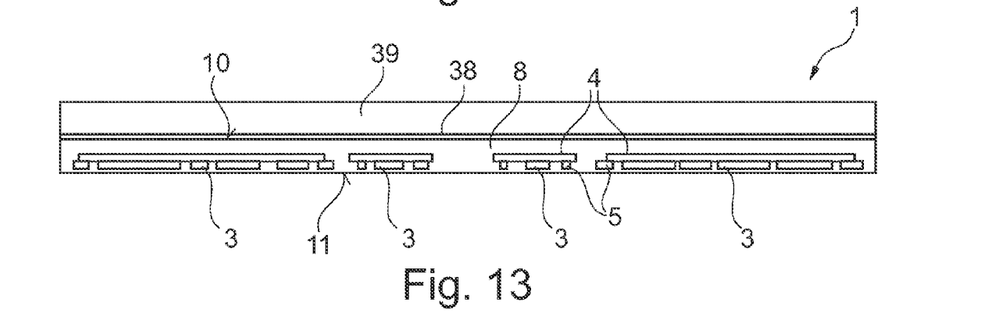
FIG. 13 shows schematically a lateral view of the instrument cluster according to FIG. 12.
Figure 14:
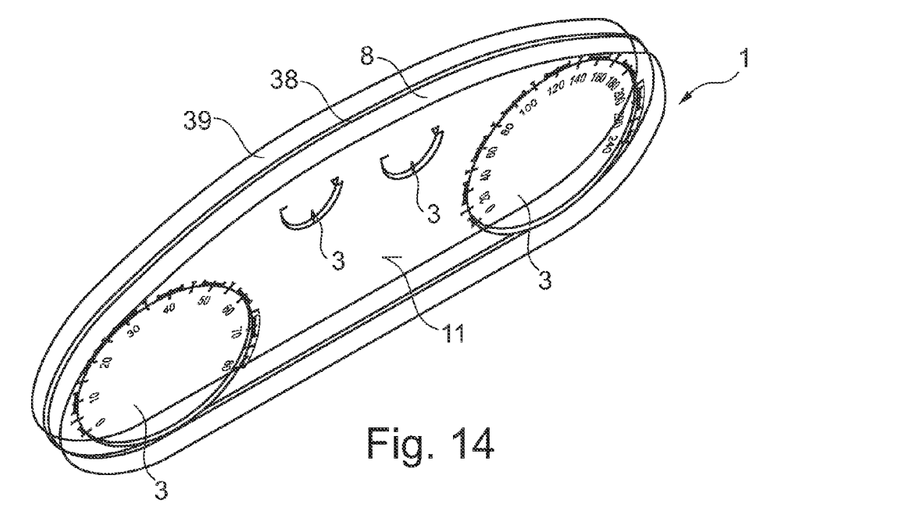
FIG. 14 shows schematically a perspective view of the instrument cluster according to FIG. 12.

In the lateral view in FIG. 13 it is visible that on the first main surface 10 of the scale disk 8 a liquid crystal 38 is arranged, which on the other side is covered by a covering disk 39 having the same shape as the scale disk 8, as is evident in the perspective view in FIG. 14.

In a version of the fifth and sixth embodiment which is not shown a plurality of scale disks 8 are provided as in the previously described embodiments, wherein all or individual ones thereof can be combined with a monitor 35. In a further version of this fifth embodiment a display instrument 2 not integrated in an instrument cluster 1 comprises both a scale element 3 and also a monitor 35.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A display instrument, comprising:
    a scale element comprising a diffusion structure that is laser shot impressed in the scale element and is substantially formed as a flat disk aligned in a substantially parallel direction to two parallel main surfaces of the scale element; and
    a scaling that is laser shot impressed on the scale element, wherein the scaling is laser shot impressed in a volume of the scale element.

2. The display instrument according to claim 1, wherein the scaling is formed through hollow bodies arranged in a volume of the scale element.

3. The display instrument according to claim 2, wherein the hollow bodies are arranged in groups in a plurality of planes.

4. The display instrument according to claim 1, wherein the scaling is formed through surfaces arranged in a volume of the scale element.

5. The display instrument according to claim 4, wherein the scale element is formed of a glass.

6. The display instrument according to claim 1, wherein the scaling is formed through packed shot layers arranged in a volume of the scale element.

7. The display instrument according to claim 1, further comprising a pointer connected to a pointer shaft in a rotationally fixed manner with a pointer flag drivable by the pointer shaft for display of a value on the scale element.

8. The display instrument according to claim 7, further comprising a pointer flag that is formed through a light scattered on the diffusion structure.

9. The display instrument according to claim 8, wherein the scale element is formed as a round disk and the light forming the pointer flag is directed from a center through a bottom surface of the round disk into the diffusion structure.

10. The display instrument according to claim 1, further comprising a device configured to admit a light for a basic illumination into the scale element.

11. The display instrument according to claim 1, further comprising a display monitor and the scale element that is arranged with respect to the display monitor or is formed as part of the display monitor.

12. The display instrument according to claim 1, further comprising a display monitor and the scale element that is formed as part of the display monitor.

* * * * *